United States Patent
Augoustidis et al.

(10) Patent No.: US 12,434,671 B2
(45) Date of Patent: Oct. 7, 2025

(54) VEHICLE INSPECTION WITH PARKING BRAKE ASSIST

(71) Applicant: Bendix Commercial Vehicle Systems LLC, Avon, OH (US)

(72) Inventors: Alexander J Augoustidis, Avon Lake, OH (US); Chitti Kolli, Avon, OH (US); Jeremy Beaulieu, Avon, OH (US); Anthony M Pitts, Avon Lake, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 423 days.

(21) Appl. No.: 18/051,916

(22) Filed: Nov. 2, 2022

(65) Prior Publication Data

US 2024/0140373 A1    May 2, 2024

(51) Int. Cl.
*B60T 7/20*    (2006.01)
*B60T 17/22*    (2006.01)

(52) U.S. Cl.
CPC ............... *B60T 7/20* (2013.01); *B60T 17/22* (2013.01)

(58) Field of Classification Search
CPC .................................. B60T 7/20; B60T 17/22
See application file for complete search history.

(56) References Cited

U.S. PATENT DOCUMENTS

| | | | |
|---|---|---|---|
| 5,226,692 A | 7/1993 | Eberling | |
| 5,680,328 A * | 10/1997 | Skorupski | G07C 5/10 |
| | | | 701/32.7 |
| 6,097,998 A | 8/2000 | Lancki | |
| 6,650,977 B2 * | 11/2003 | Miller | B60R 16/0234 |
| | | | 701/32.7 |
| 6,754,568 B1 | 6/2004 | Ripley | |
| 7,263,417 B2 | 8/2007 | Gutierrez | |
| 10,818,106 B2 | 10/2020 | Zula | |
| 2014/0054118 A1 * | 2/2014 | Rogers | B60T 13/662 |
| | | | 188/170 |

(Continued)

OTHER PUBLICATIONS

Career Now Brands, "CDL Pre-Trip Inspection Checklist," downloaded from https://cdltrainingtoday.com/wp-content/uploads/2021/08/cdl-pre-trip-inspection-checklist.pdf on Jan. 31, 2023, checklist, 7 pages, Career Now Brands, Royal Oak, Michigan U.S.A.

(Continued)

*Primary Examiner* — Pamela Rodriguez
(74) *Attorney, Agent, or Firm* — Cheryl L. Greenly; Brian E. Kondas; Geoffrey A. Kudlo

(57) ABSTRACT

A vehicle system including a pre-trip inspection algorithm includes a service brake controller for controlling service brakes at a plurality of wheel ends of a vehicle and for monitoring a change of state of the vehicle, a parking brake controller for controlling parking brakes at a plurality of wheel ends and in communication with the service brake controller; and a driver interface unit in communication with the service brake controller for receiving a driver request for an automated pre-trip inspection of a vehicle. In response to the driver request for an automated pre-trip inspection, the service brake controller automatically applies the service brakes and in response to a change of state of the vehicle, the parking brake controller applies the parking brakes automatically.

9 Claims, 3 Drawing Sheets

(56) References Cited

U.S. PATENT DOCUMENTS

2014/0288761 A1  9/2014  Butler
2015/0012445 A1  1/2015  Reid

OTHER PUBLICATIONS

U.S. Government, "Title 49 Part 396 Inspection, Repair, and Maintenance," Federal Regulation, downloaded from https://www.ecfr.gov/current/title-49/subtitle-B/chapter-III/subchapter-B/part-396 on Jan. 31, 2023, Title 49, Subtitle B, Chapter III, Subchapter B, Part 396, 12 pages, Washinton D.C. U.S.A.

* cited by examiner

VEHICLE INSPECTION WITH PARKING BRAKE ASSIST

BACKGROUND

The present application relates to a system, controller and method to provide braking assistance during a pre-trip inspection of a commercial vehicle.

In commercial vehicle applications, an inspection must be made prior to each trip to ensure that the vehicle can be operated safely. Inspections are generally manual, where the driver and/or the inspector use paper forms to document the results of the inspection as they examine the vehicle. Thorough inspections may take thirty minutes or more. In order to streamline the process, automated or partially automated pre-trip inspection systems have been proposed. For example, an automated pre-trip inspection system is described in U.S. Pat. No. 10,818,106 "System and Method for Pre-trip inspection of a tractor-trailer" issued on Oct. 27, 2020, the entire disclosure of which is incorporated herein by reference. Regardless of the method used, a vehicle may not pass inspection if any one of elements inspected is defective.

As one part of the vehicle inspection, the service brake system must be inspected visually for items such as brake wear and brake stroke. The parking brakes must be released to view the operation of the service brake system. In one example, the service brakes must be applied at a predetermined pressure to accurately view brake stroke. To perform this portion of the inspection safely, a driver must remain in the cab with their foot fully applied on the pedal while the inspector confirms that the braking system meets the minimum functionality requirements. In some cases, the inspector must look under the body of the vehicle. The inspector must rely on the driver to keep the service brakes engaged to ensure no movement of the vehicle while the inspection is being completed. In other instances, the driver may put a block or other mechanical means to hold the service brake in the actuated position while inspecting the underneath the vehicle. It is up to the driver to ensure that wheel chocks are in place to prohibit movement of the vehicle when the parking brakes are released. This can be an unsafe situation as the lone driver has no way to engage either the service brakes or the parking brakes if the vehicle were to begin to move. Therefore, there is interest in improving the inspection process for commercial vehicles to ensure that thorough inspections are completed in a timely manner.

SUMMARY

In accordance with one embodiment, a vehicle system used for pre-trip inspection includes a service brake controller for controlling service brakes at a plurality of wheel ends of a vehicle and for monitoring for a change of state of the vehicle, a parking brake controller for controller parking brakes at a plurality of wheel ends, in communication with the service brake controller and a driver interface unit in communication with the service brake controller for receiving a driver request for an automated pre-trip inspection of a vehicle. In response to the driver request for an automated inspection, the service brake controller automatically applies the service brakes and in response to a change of state of the vehicle, the parking brake controller applies the parking brakes automatically.

In accordance with another embodiment, a method for controlling a pre-trip inspection includes initiating a pre-trip inspection algorithm for a commercial vehicle, initiated an automated service brake application as part of the pre-trip inspection algorithm. In response to the state of the commercial vehicle changing, the method applies the parking brakes automatically to prevent the commercial vehicle from moving.

DETAILED DESCRIPTION

Figure 1:
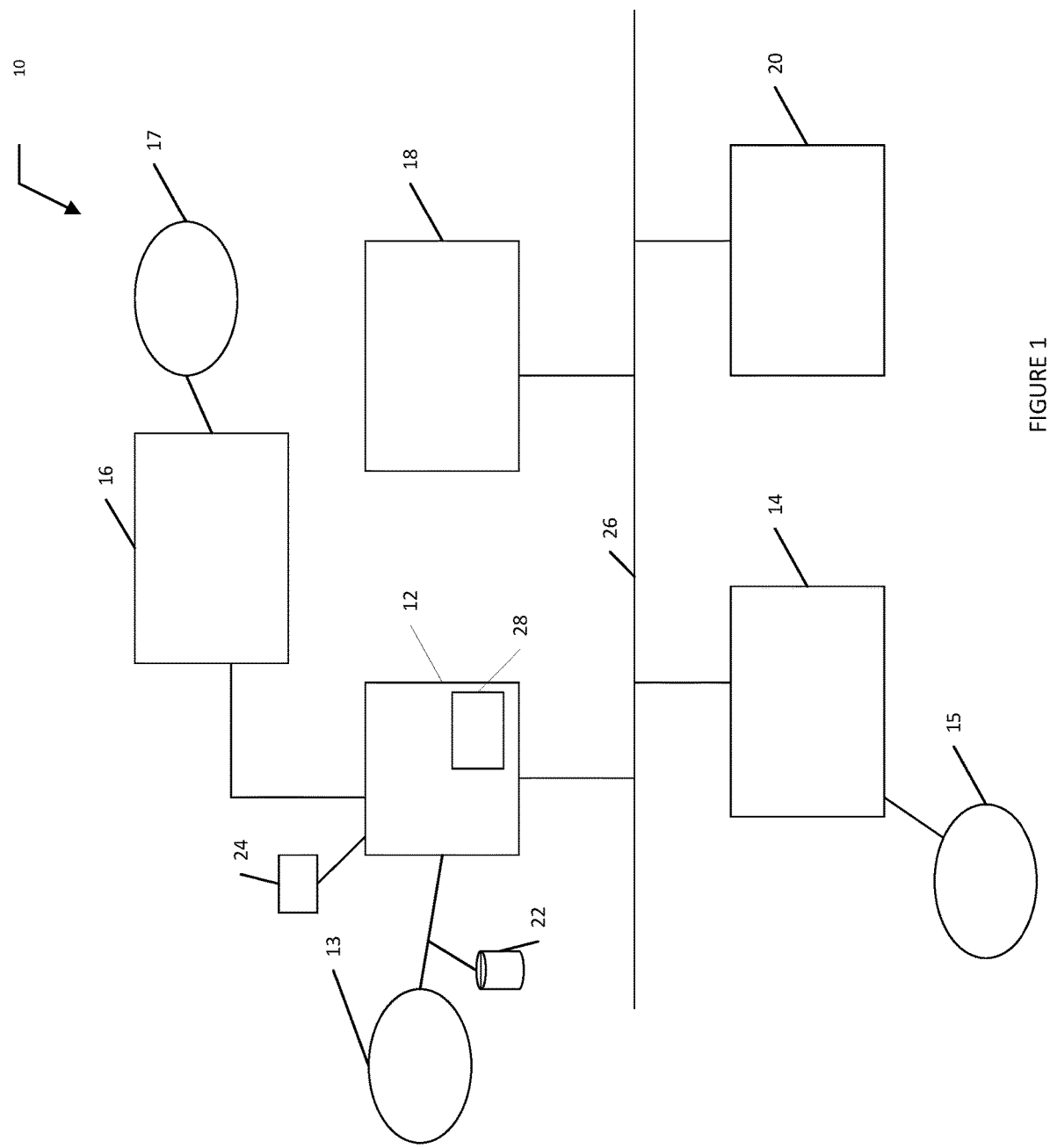
FIG. 1 is a representation of a vehicle system that can utilize a pre-trip inspection system.

Referring to FIG. 1, a vehicle system 10 having an automated pre-trip inspection system is shown. The vehicle may be a commercial vehicle, such as a tractor-trailer, having an air brake system.

The system 10 includes a service brake controller 12. The service brake controller 12 controls the actuation and release of the service brakes 13. The service brakes are generally actuated by the driver via a foot brake pedal or can be actuated autonomously through stability control or other algorithms that are part of the service brake controller 12.

The controller 12 includes a processor having control logic 28. The control logic 28 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 28. The memory of the control logic 28 is pre-programmed with the algorithm for executing the pre-trip inspection process. The control logic 28 also includes algorithms for stability control, anti-lock braking control, collision mitigation and other systems that use the service brakes to slow and/or stop the vehicle in response to input from vehicle sensors and other controllers on the vehicle.

The service brake controller 12 control logic 28 receives information from wheel speed sensors 24 located at the individual wheel ends. The wheel speed sensors 24 indicate the movement of the wheels of the vehicle. The wheel speed sensors 24 are preferably active wheel speed sensors so that any movement of the wheels in either a forward or reverse direction can be detected. However, passive wheel speed sensors can be used.

The service brake controller 12 control logic 28 receives information from at least one pressure sensor 22 which is measuring the pressure as delivered to the service brakes 13. The pressure sensor 22 indicates the level of air pressure delivered to the service brakes 13.

The system 10 includes a parking brake controller 14. The parking brake controller 14 controls the actuation and release of the parking brakes 15. The parking brakes 15 hold the vehicle stationary when actuated. The parking brakes 15 must be released when the vehicle is ready to be moved. The driver of the vehicle indicates their desire to release the parking brakes through switches in the dash or a driver interface 18 that is connected to the parking brake controller 14.

The system 10 includes the driver interface 18. The driver interface 18 may include means for the driver to indicate their desire to release the parking brakes. The driver interface 18 also includes lights or other indicators of the status of the vehicle's parking brake system and service brake system. As will be further described, the driver interface 18 may also include means for the driver to indicate readiness for beginning a pre-trip inspection process.

The system 10 also includes an engine controller 20. The engine controller 20 controls the speed of the vehicle.

All of the controllers 12, 14, 20 and driver interface 18 on the vehicle communicate on a vehicle communication bus 26. Alternatively, one or more functions of the controllers 12, 14, 20 and driver interface 18 may be combined in a single controller. The pre-trip inspection algorithm may be run through the control logic 28 of the service brake controller 12, but could also be stored in the parking brake controller 14 or another controller on the vehicle.

The system 10 may also include a trailer brake controller 16 if the vehicle is a tractor-trailer commercial vehicle. The trailer brake controller 16 controls the service brakes on the attached trailer. The trailer brake controller 16 may communicate electrically or pneumatically with the service brake controller 12.

No dedicated valves or special controllers are required to implement the pre-trip inspection algorithm of this invention.

Therefore, a vehicle system utilizing a pre-trip inspection algorithm includes a service brake controller for controlling service brakes at a plurality of wheel ends of a vehicle and for monitoring for a change of state of the vehicle, a parking brake controller for controlling parking brakes at a plurality of wheel ends and in communication with the service brake controller and a driver interface unit in communication with the service brake controller for receiving a driver request for an automated pre-trip inspection of a vehicle. In response to the driver request for an automated inspection, the service brake controller automatically applies the service brakes and in response to a change of state of the vehicle, the parking brake controller applies the parking brakes automatically.

Figure 2:
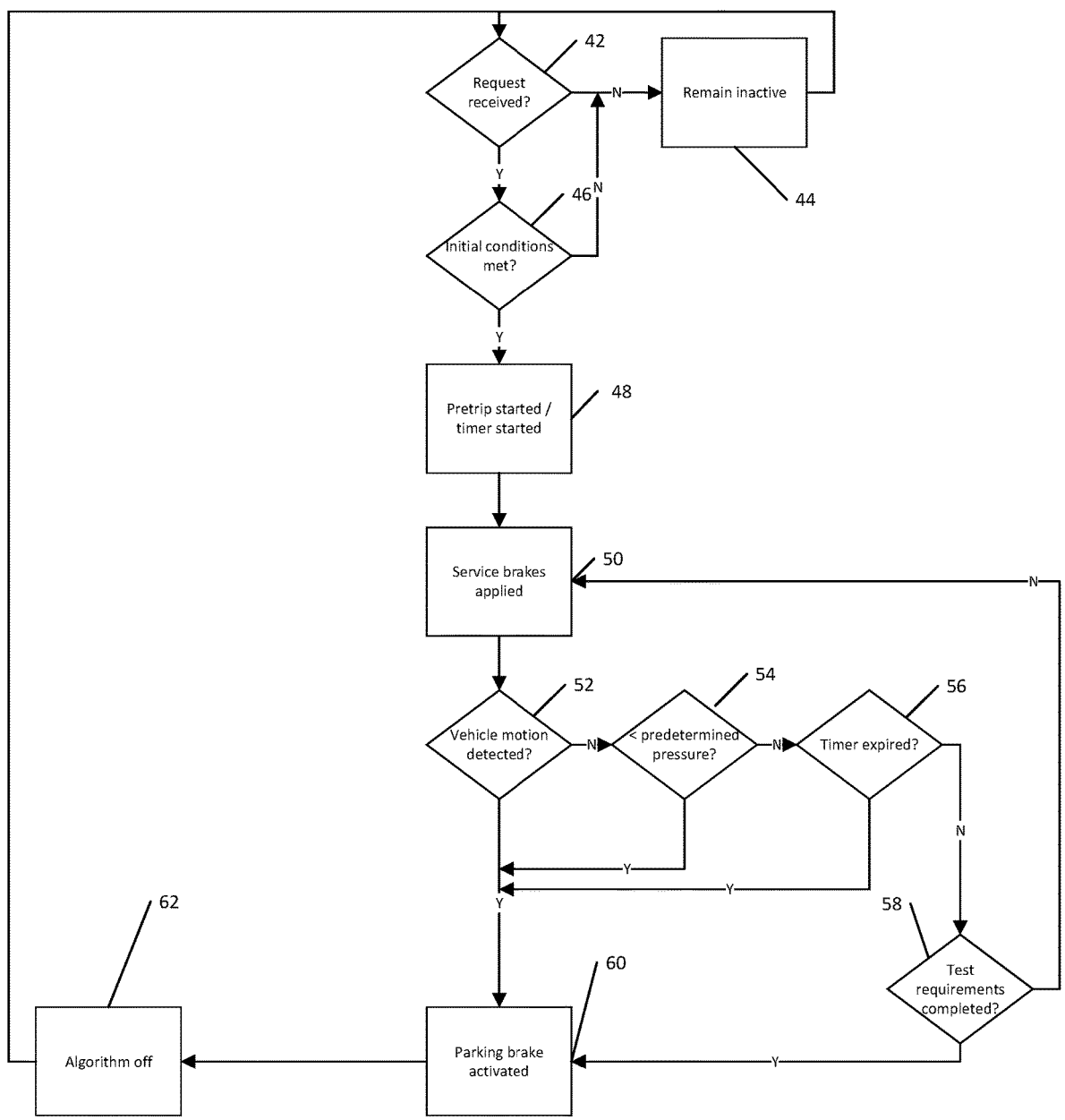
FIG. 2 is a flowchart of the method of operation of the pre-trip inspection system.

FIG. 2 shows a method 40 of the implementing the automated pre-trip inspection algorithm in the control logic 28 of the service brake controller 12 according to one example of this invention.

The method 40 begins with determining whether a request for the pre-trip inspection algorithm was received at step 42. The driver may use the driver interface 18 to initiate the pre-trip inspection algorithm through a switch or an electronic command. Alternatively, the pre-trip inspection algorithm may be initiated automatically upon start-up of the vehicle.

If no request is received, the pre-trip inspection algorithm remains inactive in step 44 and the method 40 returns to step 42 to wait for the request.

If the request is received, the control logic 28 checks for initial conditions of the vehicle to be met in step 46. For example, the pre-trip inspection algorithm may check to ensure that the reservoirs providing the supply pressure to the service brakes 13 includes a minimum air pressure. In another example, the pre-trip inspection algorithm may receive information regarding the incline of the vehicle from another controller, such as the engine controller 20. The pre-trip inspection algorithm would not begin if a certain vehicle gradient was exceeded. In another example, the pre-trip inspection algorithm may check to ensure that the brake controller 12 or other controllers 14, 16, 20 do not have active faults before initiating the pre-trip inspection algorithm. The control logic 28 may receive the information directly or through the vehicle communications bus 26. In another example, the control logic 28 receives information that the driver is applying the service brakes with the foot brake pedal. Other checks of operability of the vehicle system 10 may be done before the pre-trip inspection algorithm is begun. If the initial conditions for starting the pre-trip algorithm are not met, the method 40 remains inactive at step 44.

If the initial conditions for starting the pre-trip algorithm are met, the pre-trip inspection algorithm is initiated in step 48. The pre-trip inspection algorithm includes steps to monitor the behavior of the vehicle as certain tests are being implemented. At the time the pre-trip inspection algorithm is started, a timer is also started by control logic 28.

In the present implementation of the pre-trip inspection algorithm, the service brakes 13 are automatically applied in step 50. The service brakes may be applied to a predetermined or a configurable pressure level. For example, a predetermined pressure level may be about eighty (80) psi. In another example, the driver or owner of the vehicle may configure the pressure level to be applied during the pre-trip inspection through the driver interface 18.

If a trailer is connected to the vehicle, the service brake controller 12 will communicate pneumatically with the trailer brake controller 16 or electronically via the tractor to trailer communications network. The trailer service brakes 17 will be applied in response. The service brakes 13 can be automatically applied at all wheel ends or may be applied to more than one wheel end. The automatic application can be made at a predetermined pressure as required by the inspection standards. In one example, full reservoir pressure is applied, which may be between 80 and 100 psi. The automatic application of the service brakes 13 will allow the driver to leave the cab in order to visually inspect the brake stroke and other components of the brake systems. The service brake controller 12 will ensure through the pressure sensor 22 that the service brakes 13 are receiving the full reservoir pressure. The service brake controller will ensure that the vehicle is stationary via the wheel speed sensors 24 indicating that there is zero wheel speed. The service brake controller 12 will also receive information from the engine controller 20 that the vehicle engine is not in a drive mode. The service brake controller 12 may also receive confirmation from the trailer brake controller 16 that the trailer service brakes are also engaged.

In one part of the inspection, the driver can listen for any audible air leaks while outside the cab. In another part of the inspection, the driver can inspect push rod stroke at the actuator at each wheel end. In another part of the inspection, the driver can inspect whether the brake pad is touching the brake drum or brake rotor at each wheel end. In another part of the inspection, the driver can confirm that the brake lamps are functional. The driver does not have to have her foot on the pedal for the service brakes to be engaged according to this pre-trip inspection algorithm.

In order to provide anti-compounding of the brakes, the pre-trip inspection system can also request release of the parking brakes 15 when the pre-trip inspection algorithm is requested, and service brake are automatically applied.

In order to provide safety backup features, the pre-trip inspection algorithm monitors for state changes of the vehicle. In step 52, vehicle motion through the time the service brakes are engaged is monitored through the wheel speed sensors 24. As long as the vehicle remains stationary via information from the wheel speed sensors 24, then the pre-trip inspection algorithm continues to step 54.

As another vehicle state, the control logic 28 of the service brake controller 12 monitors the pressure delivered to the wheel ends in step 54 by receiving information from the pressure sensor 22 regarding the pressure provided to the service brakes 13. If the pressure is greater than a predetermined pressure, the method 40 continues to step 56.

In step 56, the timer begun by the control logic 28 is reviewed to determine if a predetermined time period has expired. The time period may be set based on how long the solenoids that provide the pressure to the service brakes 13 automatically should remain on. The predetermined time period can be set to ensure that the driver does not leave her vehicle for a time longer than a normal inspection period, such as twenty minutes. If the timer has not expired, the method continues to step 58.

As part of step 58, the driver can return to the cab and indicate through the driver interface 18 that the pre-trip inspection process has been completed. The pre-trip inspection algorithm can receive a "test finished" message from the driver interface device 18. Alternatively, the driver confirms that all inspections have been passed before entering the test completed mode in step 58. The service brakes 13 will remain applied until the message is received. The driver interface 18 may inform the driver that they must put their foot on the brake pedal before the system will disengage. The parking brakes 15 will be automatically engaged again in step 60. The method 40 will disengage the algorithm in step 62 and return to step 42.

If no message is received from the driver that the test requirements are complete in step 58, the method 40 returns to step 50 to keep the service brakes engaged until one of the conditions in steps 52, 54, 56 or 58 are met.

Engagement of the parking brakes during the pre-trip inspection may be logged in the service brake controller 12 as well as indicated to the driver through the driver interface 18.

If any motion is detected by the wheel speed sensors in step 52, then the parking brakes 15 will be activated in step 60. If the pressure at the service brakes 13 is less than a predetermined pressure in step 54, the parking brakes 15 will be activated in step 60. If the pressure drops below the predetermined pressure at which the service brakes were applied, the parking brake controller 14 will actuate the parking brakes 15 as in step 54. If the timer is expired as in step 56, the parking brakes 15 will be activated in step 60. The premature stoppage of the pre-trip inspection algorithm can be recorded by the control logic 28. A warning to the driver that the pre-trip inspection algorithm has been cancelled can be made through the driver interface unit 18 as part of step 60. The parking brakes 15 will hold the vehicle stationary. The pre-trip inspection algorithm will automatically end in step 62 and return to step 42 to wait for another request.

Therefore, a method for controlling a pre-trip inspection includes initiating a pre-trip inspection algorithm for a commercial vehicle, initiated an automated service brake application as part of the pre-trip inspection algorithm. In response to the state of the commercial vehicle changing, the method applies the parking brakes automatically to prevent the commercial vehicle from moving.

Figure 3:
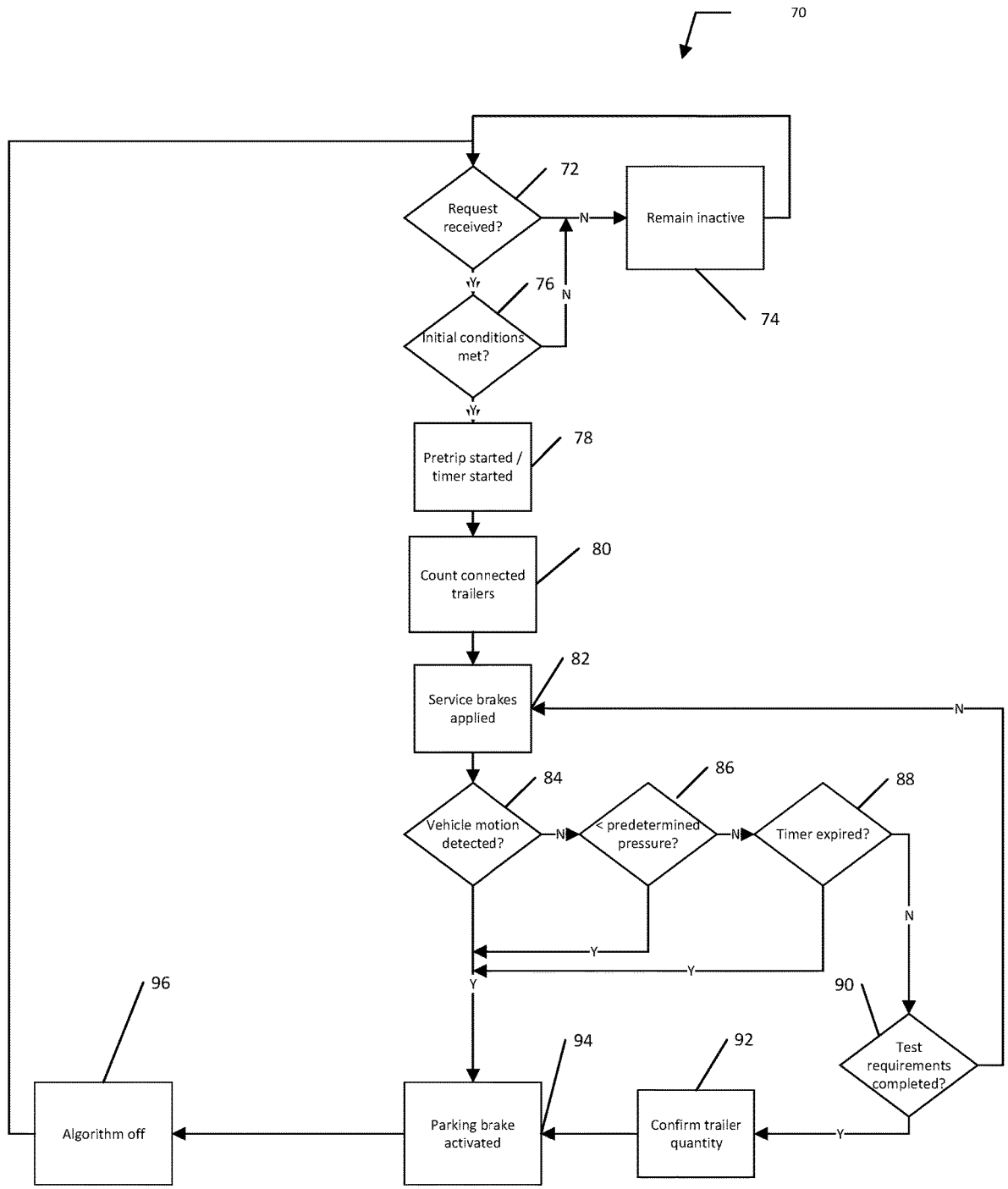
FIG. 3 is a flowchart of another method of operation of the pre-trip inspection system.

FIG. 3 shows a method 70 of the implementing a automated pre-trip inspection algorithm in the control logic 28 of the service brake controller 12 according to another example of this invention. Many of the steps are similar to those in method 40, but method 70 is particularly useful with tractor-trailers or other combination vehicles.

The method 70 begins with determining whether a request for the pre-trip inspection algorithm was received at step 72. The driver may use the driver interface 18 to initiate the pre-trip inspection algorithm through a switch or an electronic command. Alternatively, the pre-trip inspection algorithm may be initiated automatically upon start-up of the vehicle.

If no request is received, the pre-trip inspection algorithm remains inactive in step 74 and the method 70 returns to step 72 to wait for the request.

If the request is received, the control logic 28 checks for initial conditions of the vehicle to be met in step 76, similar to step 46. If the initial conditions for starting the pre-trip algorithm are not met, the method 70 remains inactive at step 74.

If the initial conditions for starting the pre-trip algorithm are met, the pre-trip inspection algorithm is initiated in step 78. The pre-trip inspection algorithm includes steps to monitor the behavior of the vehicle as certain tests are being implemented. At the time the pre-trip inspection algorithm is started, a timer is also started by control logic 28.

As part of the method 70, the control logic 28 will look for and count trailers or towed vehicles in step 80. The control logic 28 may monitor the power line between the tractor and trailer for power line carrier (PLC) messages, which would be generated by each trailer anti-lock brake system (ABS) controller upon power up. The control logic 28 may monitor the separate tractor-trailer controller area network (TT-CAN) between the tractor and trailer. Each trailer ABS controller would also transmit messages on the TT-CAN. Each message has a special identification of the trailer ABS associated with it. Each message received by the control logic 28 having a unique identifier will be counted as a towed vehicle connected to the towing vehicle by the control logic 28.

The service brakes 13 are automatically applied in step 82. If a trailer is connected to the vehicle, which is learned by the control logic 28 in step 80, the service brake controller 12 will communicate pneumatically with the trailer brake controller 16 or electronically via the TT-CAN. The trailer service brakes 17 will be applied in response. The service brakes 13 can be automatically applied at all wheel ends or may be applied to more than one wheel end, similar to step 50 in method 40.

In order to provide safety backup features, the pre-trip inspection algorithm monitors for state changes of the vehicle. In step 84, vehicle motion through the time the service brakes are engaged is monitored through the wheel speed sensors 24. As long as the vehicle remains stationary via information from the wheel speed sensors 24, then the pre-trip inspection algorithm continues to step 86.

As another vehicle state, the control logic 28 of the service brake controller 12 monitors the pressure delivered to the wheel ends in step 86 by receiving information from the pressure sensor 22 regarding the pressure provided to the service brakes 13. If the pressure is greater than a predetermined pressure, the method 70 continues to step 88.

In step 88, the timer begun by the control logic 28 is reviewed to determine if a predetermined time period has expired. The time period may be set based on how long the solenoids that provide the pressure to the service brakes 13 automatically should remain on. The predetermined time period can be set to ensure that the driver does not leave her vehicle for a time longer than a normal inspection period, such as twenty minutes. If the timer has not expired, the method continues to step 90.

As part of step 90, the driver can return to the cab and indicate through the driver interface 18 that the pre-trip inspection process has been completed. The pre-trip inspection algorithm can receive a "test finished" message from the driver interface device 18. Alternatively, the driver confirms that all inspections have been passed before entering the test completed mode. The service brakes 13 will remain applied until the message is received. The driver interface 18 may inform the driver that they must put their foot on the brake pedal before the system will disengage.

As part of method 70, the control logic 28 will confirm in step 92 that the number of towed vehicles counted in step 80 matches a preset number of towed vehicles preprogrammed in the control logic 28 to be connected. Alternatively, the control logic 28 may ask for confirmation from the driver that the number of towed vehicles counted matches the number of towed vehicles from his visual inspection.

The parking brakes 15 will be automatically engaged again in step 94. The method 70 will disengage the algorithm in step 96 and return to step 72.

If no message is received from the driver that the test requirements are complete in step 90, the method 70 returns to step 82 to keep the service brakes engaged until one of the conditions in steps 84, 86 or 88 are met.

If any motion is detected by the wheel speed sensors in step 84, then the parking brakes 15 will be activated in step 94. If the pressure at the service brakes 13 is less than a predetermined pressure in step 86, the parking brakes 15 will be activated in step 94. If the pressure drops below the predetermined pressure at which the service brakes were applied, the parking brake controller 14 will actuate the parking brakes 15 as in step 94. If the timer is expired as in step 88, the parking brakes 15 will be activated in step 94. The premature stoppage of the pre-trip inspection algorithm can be recorded by the control logic 28. A warning to the driver that the pre-trip inspection algorithm has been cancelled can be made through the driver interface unit 18 as part of step 94. The parking brakes 15 will hold the vehicle stationary. The pre-trip inspection algorithm will automatically end in step 96 and return to step 72 to wait for another request.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A vehicle system comprising:
   a service brake controller for controlling service brakes at a plurality of wheel ends of a vehicle and for monitoring a change of state of the vehicle;
   a parking brake controller for controlling parking brakes at a plurality of wheel ends and in communication with the service brake controller; and
   a driver interface unit in communication with the service brake controller for receiving a driver request for an automated pre-trip inspection of the vehicle, wherein in response to the driver request for the automated pre-trip inspection, the service brake controller initiates a timer and automatically applies the service brakes and in response to the change of state of the vehicle, the parking brake controller applies the parking brakes automatically in response to an expiration of a predetermined time period.

2. The vehicle system as in claim 1, wherein the service brake controller and the parking brake controller are integrated as a single controller.

3. The vehicle system as in claim 1, wherein the change of state of the vehicle includes one of motion of the vehicle, pressure change of the service brakes of the vehicle and an expiration of a predetermined time period.

4. A method for controlling a pre-trip inspection of a commercial vehicle comprising:
   initiating a pre-trip inspection algorithm for the commercial vehicle;
   initiating an automated service brake application on the commercial vehicle as part of the pre-trip inspection algorithm;
   initiating a timer in response to the initiating the pre-trip inspection algorithm;
   detecting that a state of the commercial vehicle has changed; and
   applying parking brakes on the commercial vehicle automatically in response to an expiration of a predetermined time period to prevent the commercial vehicle from moving.

5. The method as in claim 4 wherein the initiation of the automated service brake application is received from a driver interface.

6. The method as in claim 4, wherein detecting that the state of the commercial vehicle has changed is detecting that the vehicle is moving.

7. The method as in claim 6, wherein detecting that the vehicle is moving includes detecting a wheel speed greater than zero.

8. The method as in claim 4, wherein detecting that the state of the commercial vehicle has changed includes detecting that the pressure applied in the automated service brake application is less than a predetermined pressure.

9. The method as in claim 4, further comprising counting a number of towed vehicles attached to the commercial vehicle.

\* \* \* \* \*